United States Patent
Bayerl

(10) Patent No.: US 9,900,384 B2
(45) Date of Patent: Feb. 20, 2018

(54) DISTRIBUTED CACHING IN A COMMUNICATION NETWORK

(71) Applicant: Adobe Systems Incorporated, San Jose, CA (US)

(72) Inventor: Franz Xaver Bayerl, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 724 days.

(21) Appl. No.: 13/940,574

(22) Filed: Jul. 12, 2013

(65) Prior Publication Data

US 2015/0019673 A1    Jan. 15, 2015

(51) Int. Cl.
*G06F 15/16* (2006.01)
*H04L 29/08* (2006.01)

(52) U.S. Cl.
CPC ........ *H04L 67/1097* (2013.01); *H04L 67/288* (2013.01); *H04L 67/2842* (2013.01)

(58) Field of Classification Search
USPC ........................................................ 709/219
See application file for complete search history.

(56) References Cited

U.S. PATENT DOCUMENTS

| | | | | |
|---|---|---|---|---|
| 6,065,058 A * | 5/2000 | Hailpern | ............ | H04L 12/1859 370/270 |
| 6,122,666 A * | 9/2000 | Beurket | ............ | G06F 17/30902 707/E17.12 |
| 6,275,937 B1 * | 8/2001 | Hailpern | ............ | G06F 21/566 709/201 |
| 6,742,023 B1 * | 5/2004 | Fanning | ............ | G06F 17/30194 707/E17.032 |
| 7,313,565 B2 * | 12/2007 | Zhang | ............ | G06F 17/30094 |
| 7,818,444 B2 * | 10/2010 | Brueck | ............ | H04L 29/06027 709/231 |
| 7,996,550 B2 * | 8/2011 | Fischer | ............ | H04L 67/104 370/230 |

(Continued)

FOREIGN PATENT DOCUMENTS

| | | | | | |
|---|---|---|---|---|---|
| GB | 2444339 A | * | 6/2008 | ......... | H04L 9/3236 |
| GB | 2444343 A | * | 6/2008 | ......... | H04L 67/1074 |

OTHER PUBLICATIONS

"HTTP Range Cache FS", [Online]. Retrieved from the Internet: <URL: http://www.mosalov.com/wiki/HTTP_Range_Cache_FS>, (Accessed Jun. 17, 2013), 2 pgs.

(Continued)

*Primary Examiner* — Alicia Baturay
(74) *Attorney, Agent, or Firm* — Shook, Hardy & Bacon L.L.P.

(57) ABSTRACT

Example systems and methods of caching data in a communication network are presented. In one example, a data resource at an originating server of the communication network is partitioned into multiple data partitions. At the originating server, a unique address is assigned to each of the data partitions. Each of the data partitions is distributed to at least one of a plurality of proxy servers based on the unique addresses. Each of the proxy servers is configured to receive a read request for one of the data partitions stored at the proxy server, and to transmit the one of the data partitions to a source of the read request in response to the read request.

16 Claims, 8 Drawing Sheets

(56) References Cited

U.S. PATENT DOCUMENTS

| | | | |
|---|---|---|---|
| 8,169,916 B1* | 5/2012 | Pai | H04N 21/2181 370/236 |
| 8,200,923 B1* | 6/2012 | Healey | G06F 11/1453 711/108 |
| 8,386,630 B1* | 2/2013 | Atzmon | H04L 65/605 455/41.2 |
| 8,838,823 B2* | 9/2014 | Guo | H04N 7/17336 709/202 |
| 9,069,876 B2* | 6/2015 | Uola | G06F 17/30902 |
| 9,451,024 B2* | 9/2016 | Hughes | G06F 3/0643 |
| 2007/0028133 A1* | 2/2007 | Izutsu | H04L 67/104 714/4.11 |
| 2008/0104325 A1* | 5/2008 | Narad | G06F 12/0862 711/122 |
| 2008/0307169 A1* | 12/2008 | Averill | G06F 12/0817 711/146 |
| 2009/0210489 A1* | 8/2009 | Deb | H04L 67/104 709/204 |
| 2009/0254572 A1* | 10/2009 | Redlich | G06Q 10/06 |
| 2009/0313353 A1* | 12/2009 | Lou | G06F 21/10 709/219 |
| 2010/0115204 A1* | 5/2010 | Li | G06F 12/0811 711/130 |
| 2010/0223505 A1* | 9/2010 | Andreev | G06F 11/3668 714/37 |
| 2010/0268902 A1* | 10/2010 | Drobychev | G06F 17/30091 711/156 |
| 2012/0159098 A1* | 6/2012 | Cheung | G06F 12/0261 711/162 |
| 2012/0185530 A1* | 7/2012 | Reza | H04N 21/2343 709/203 |
| 2012/0254541 A1* | 10/2012 | Beckmann | G06F 12/0802 711/122 |
| 2013/0336209 A1* | 12/2013 | Gage | H04L 12/5691 370/328 |
| 2014/0052706 A1* | 2/2014 | Misra | G06F 17/30194 707/698 |
| 2014/0095605 A1* | 4/2014 | Varvello | H04L 67/108 709/204 |
| 2015/0032900 A1* | 1/2015 | Shanson | H04L 65/4084 709/231 |

OTHER PUBLICATIONS

"s3fuse FUSE driver for Amazon S3 buckets", [Online]. Retrieved from the Internet: <URL: http://code.google.com/p/s3fuse/, (Accessed Jun. 17, 2013), 3 pgs.

* cited by examiner

DISTRIBUTED CACHING IN A COMMUNICATION NETWORK

FIELD

This application relates generally to data processing and, in an example embodiment, to distributed caching of data in a communication network.

BACKGROUND

One major benefit of many communication networks is the ability to facilitate access by many hundreds or thousands of machines to data resources, such as files, stored in servers of the network. Many of these resources, such as HyperText Transfer Protocol (HTTP) resources, may be relatively or extremely large in size, such as hundreds of megabytes or more. Such resources may be, for example, video files, audio files, still image files, and so on.

Generally, data resources available on a network are requested and transmitted in their entirety. However, under many scenarios, a device may require only a portion of a resource to perform some meaningful function. For example, an application executing on a device may request only a portion of a large image to display to a user. To satisfy such a request, some devices may download an entire resource from a resource server, such as an HTTP server, after which the device may then service random access requests from the application executing on the device. Using such a mechanism, however, the entire data resource or file may be downloaded from the server prior to allowing access to the data, possibly resulting in a significant time delay before any data is available to the application.

In other examples, a requesting device may issue HTTP Range Requests to a server, which services those requests to provide portions of the data resource directly to the requesting device. However, the requesting device may need to issue multiple such requests to obtain the desired portion of the data resource. In many cases, these multiple requests, with their associated network delays, roundtrip transmission times, and so on, may require more overall time than a single transmission of the entire data resource to the requesting device.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
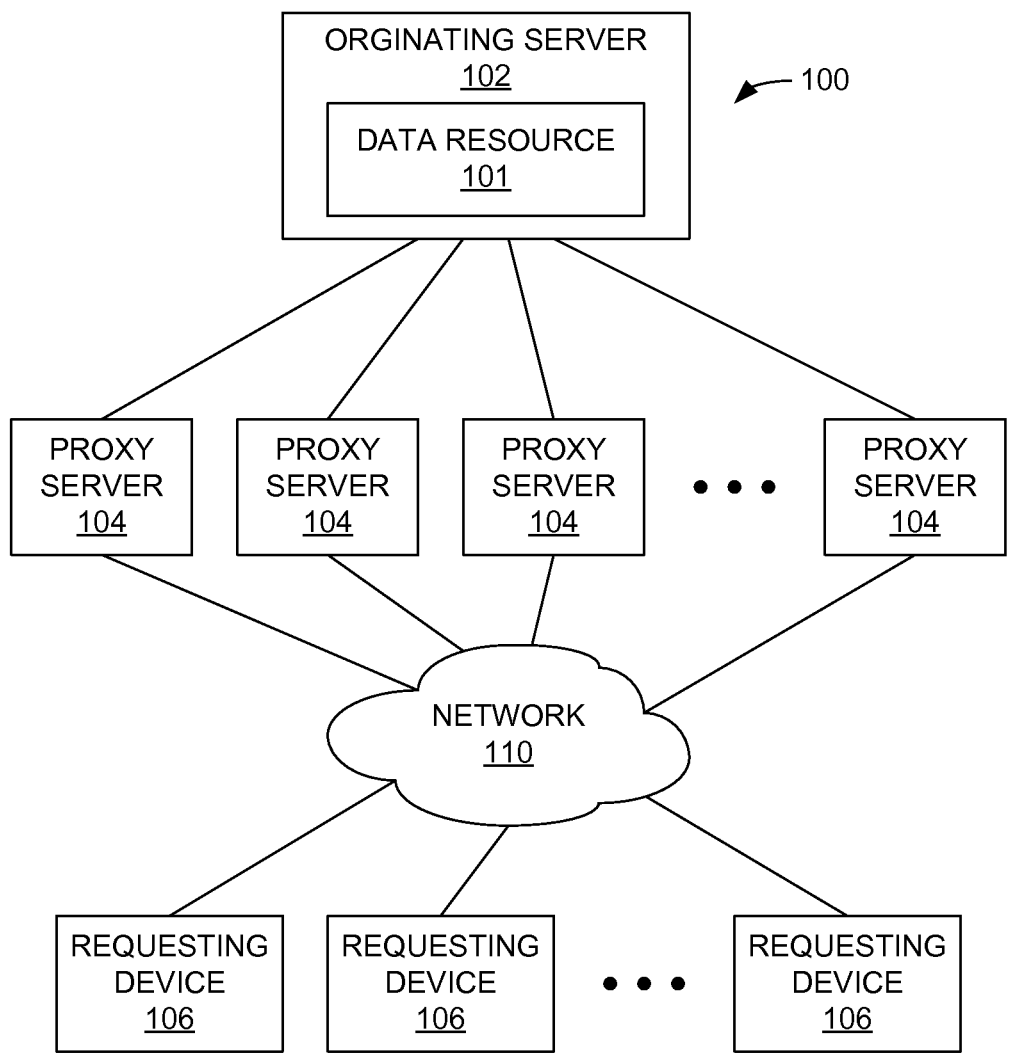
FIG. 1 is a block diagram of an example communication network employing distributed caching.

FIG. 1 is a block diagram of an example communication system 100 employing distributed caching, as described herein. In an implementation, the communication system 100 includes an originating server 102 that includes, or has access to, a data resource 101. Communicatively coupled to the originating server 102 are multiple proxy servers 104 that, in turn, may be connected via a network 110 to a plurality of requesting devices 106, each of which may request access to at least one portion of the data resource 101. In one example, the data resource 101 is partitioned into multiple partitions, each of which is distributed to at least one of the proxy servers 104. Each of the requesting devices 106 may then request one or more specific partitions from one or more of the proxy servers 104 via the network 110, with the proxy servers 104 possessing the requested partitions transmitting those partitions to the corresponding requesting devices 106 via the network 110. In one example, the proxy servers 104 may communicate with the originating server 102, including the receiving of the partitions of the data resource 101, via the network 110, another communication network, direct communication connections, or other means.

Each of the originating server 102 and the proxy servers 104 may be any server or other computing system capable of storing or otherwise accessing the data resource 101 or partitions thereof. The data resource 101, in some examples, may be, but is not limited to, a data file, such as a video file, an audio file, a text file, an image file, or some combination thereof.

The network 110 may be any communication network configured to facilitate communication between at least the proxy servers 104 and the requesting devices 106. Examples of the network 110 include, but are not limited to, a wide-area network (WAN, such as the Internet), a local-area network (LAN, such as a Wi-Fi® network), a cellular communication network (such as a 3G (third-generation) or 4G (fourth generation) network), or any other wired or wireless communication network.

Each of the requesting devices 106 may be any computing device configured to receive, and possibly consume, the data resource 101 or at least one portion thereof. In at least some implementations, a requesting device 106 may be a user device, including, but not limited to, a desktop computer, a laptop computer, a tablet computer, a gaming system, a smart phone, and a personal digital assistant (PDA).

Figure 2:
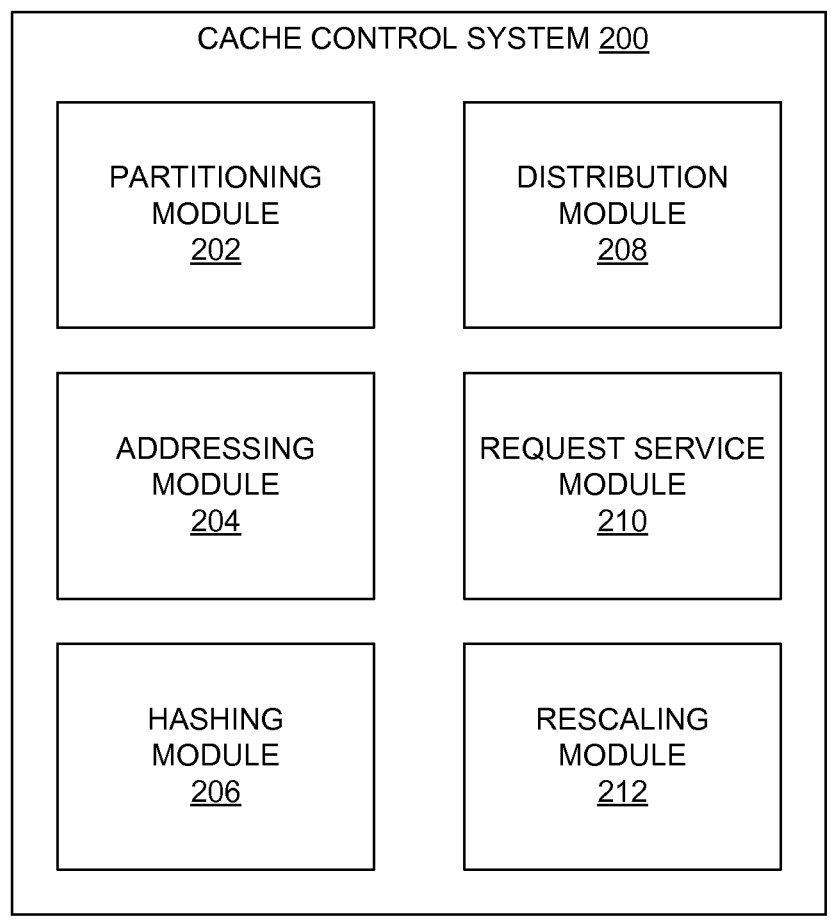
FIG. 2 is a block diagram of an example cache control system.

FIG. 2 is a block diagram of an example cache control system 200 that may configure, control, and/or monitor the communication network 100 of FIG. 1, or various portions thereof, to facilitate the distributed caching of the data resource 101 described herein. In some examples, the cache control system 200 may be incorporated within at least one of the originating server 102, the proxy servers 104, the network 110, the requesting devices 106, and one or more combinations thereof. In other implementations, the cache control system 200 may include one or more computing systems separate from any one or more of the originating server 102, the proxy servers 104, the network 110, and the requesting devices 106.

As depicted in FIG. 2, the cache control system 200 may include a partitioning module 202, an addressing module 204, a hashing module 206, a distribution module 208, a request service module 210, and a rescaling module 212. Further, in some embodiments, some of the modules 202-212 of the cache control system 200 may be combined with others, or subdivided into further modules. Also, other examples of the cache control system 200 may include modules in addition to the modules 202-212 of FIG. 2, or may omit some of the modules 202-212. Additionally, each of the modules 202-212 may include hardware, software, firmware, or some combination thereof.

The partitioning module 202 may partition the data resource 101 of FIG. 1 into multiple partitions, each of which may be separately accessed by the requesting devices 106. In one example, the partitioning module 202 may store each of the partitions of the data resource 101 in the originating server 102 for subsequent distribution to the proxy servers 104.

In some implementations, the partitioning module 202 may partition the data resource 101 into partitions of equal length or size. In situations in which the length of the data resource 101 is not a multiple of the partition length, the partitioning module 202 may pad one of the partitions (e.g., the last partition of the data resource 101) with additional data, or perform some other corrective action to maintain the same partition length for all partitions.

In one example, the partitioning module 202 may employ the same partition length for each of multiple data resources 101 that are to be partitioned. In other implementations, the partitioning module 202 may employ different partition lengths for different data resources 101 depending on, for example, the overall length of each data resource 101, the type of data included in the data resource 101, and other factors.

The addressing module 204 may assign a unique address to each of the partitions of the data resource 101. In one example, the address for each of the partitions may be based on an identifier of the data resource 101, such as a uniform resource locator (URL) or other communication network address of the data resource 101, and a byte offset of the beginning of the partition relative to the beginning of the data resource 101. By generating the address in such a manner, a requesting device may issue a request for data from the data resource 101 that may include an identifier of the data resource 101 and an indication of the beginning and ending byte offsets within the data resource 101 of the requested data. In response, the partitions of the data resource 101 that include the requested data may then be returned to the requesting device 106. In other examples in which the length of each of the partitions is known, the unique address may be based on the identifier of the data resource 101 and an identifier of the partition, such as a partition sequence number. Other methods by which a unique address for each partition is generated may be employed in other examples of the addressing module 204.

The hashing module 206 may hash or similarly process each of the unique partition addresses generated in the addressing module 204 to generate hashed partition addresses. The hashing module 206 may utilize any suitable hashing algorithm, such as, for example, a cyclic redundancy check (CRC) function or one of the Secure Hash Algorithms (SHA), to map each unique address to a different hashed unique address. In one example, the values of the hashed unique addresses sparsely populate at least a portion of some span of possible hash values.

Given the hashed unique addresses, the distribution module 208 may then distribute each of the partitions to one or more of the proxy servers 104 based on its corresponding hashed unique address. In one example, the distribution module 208 may assign a range of the possible hash values to each of the proxy servers 104. The assigned ranges for the proxy servers 104 may be overlapping or non-overlapping. Also, in some examples, the ranges assigned to the proxy servers 104 may be approximately equal to each other in length. For each partition, the distribution module 208 may then distribute or transmit the partition to the proxy server 104 or servers corresponding to a range of the possible hash values that includes the hashed unique address of the partition. In some cases, only a single proxy server 104 may include a particular partition, while in other scenarios, more than one proxy server 104 may include at least one of the partitions to provide some degree of redundancy.

A possible result of the hashing and distribution operations is that the partitions of the data resource 101 may be somewhat randomly distributed across all of the proxy servers 104, possibly reducing communication bottlenecks during access of the partitions by multiple requesting devices 106.

In some examples, the distribution module 208, the addressing module 204, or some combination thereof, may generate a map, table, or other information identifying the one or more proxy servers 104 in which each of the partitions of the data resource 101 are stored.

The request service module 210 may service requests issued by one or more of the requesting devices 106. In one example, the request service module 210 receives a request for at least one of the partitions from a request source, such as one of the requesting devices 106. For example, the request may directly specify the one or more partitions being requested, or may specify a range of bytes, such as, for example, by way of a first byte offset and a last byte offset, within the data resource 101, from which the request service module 210 may then determine the particular partitions to be retrieved. In response to the request, the request service module 210 may then determine which of the proxy servers 104 possesses each partition of interest, retrieve the partitions from their respective proxy servers 104, and transmit the retrieved partitions to the requesting device 106. In one embodiment, the request service module 210 may consult a map, table, or information identifying the proxy servers 104 and their corresponding partitions, as described above, to determine which proxy server 104 possesses each partition. In another example, the request service module 210 may consult information concerning the hashed version of the address for each desired partition and the range of the hashed addresses for each of the proxy servers 104 to determine the proxy server 104 storing each desired partition.

The rescaling module 212, in response to a change in the number of proxy servers 104 available to store the partitions of the data resource 101, may recalculate or re-determine the range of hashed unique partition addressees corresponding to each of the proxy servers 104 now available. For example, if at least one additional proxy server 104 has been made available, the rescaling module 212 may reapportion the extent of hashed unique addresses into a number of ranges equal to the number of proxy servers 104, including the newly added proxy server 104 or servers. The rescaling module 212 may then assign each range to the available proxy servers 104 and re-distribute the partitions to the proxy servers 104 according to the assigned ranges. In one example, the rescaling module 212 may employ the distribution module 208 to perform at least some portion of these operations, or the rescaling module 212 may exist as a portion of the distribution module 208.

Figure 3:
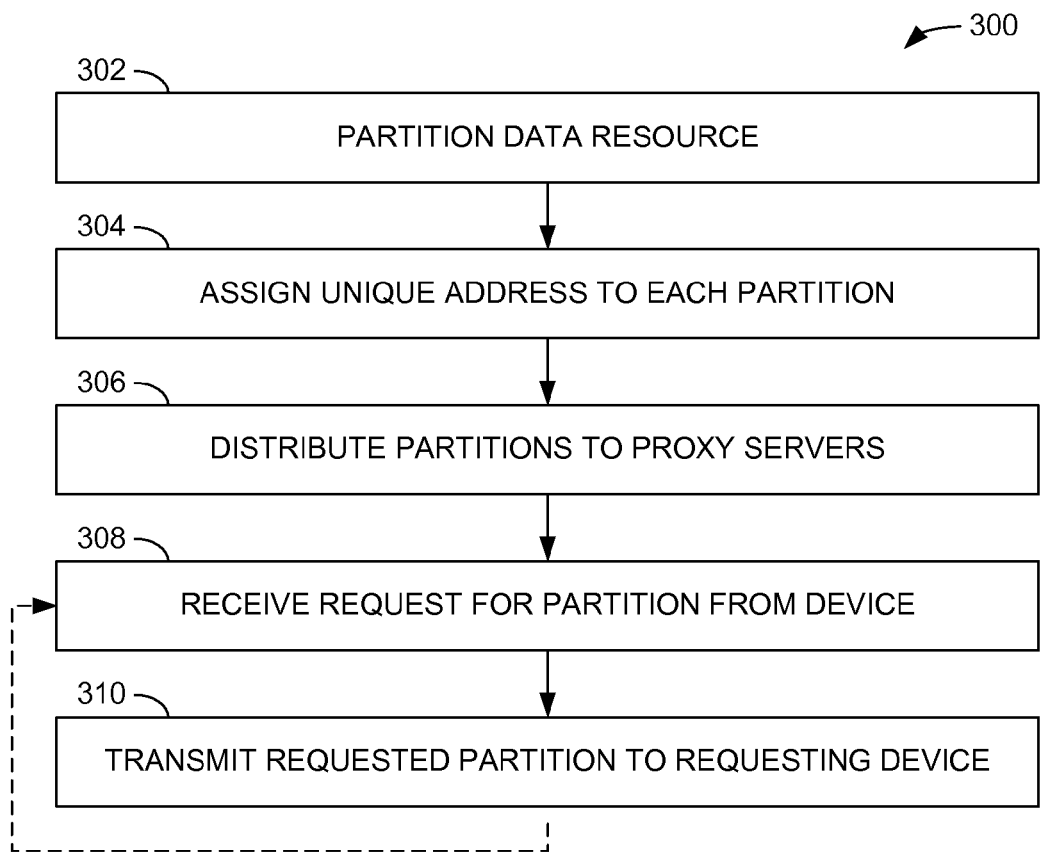
FIG. 3 is a flow diagram illustrating an example method of distributed caching in a communication network.

FIG. 3 is a flow diagram illustrating an example method 300 of distributed caching in a communication network, such as the communication network 100 of FIG. 1. However, other communication networks aside from the communication network 100 may be employed to perform the method 300 in other embodiments. Further, an example system capable of performing the operations of method 300 may be the cache control system 200 of FIG. 2 or some other system.

In the method 300, the data resource 101 of the originating server 102 may be partitioned or divided into multiple partitions (operation 302), and each partition may be assigned a unique address (operation 304). Each of the partitions may be distributed to one or more of the proxy servers 104 (operation 306). A request for one of the partitions may be received from a requesting device 106 (operation 308) at the proxy server 104 storing the requested partition. In response to the request, the proxy server 104 may transmit the requested partition to the requesting device 106 (operation 310), such as by way of the network 110.

While operations 302 through 310 of the method 300 of FIG. 3 are shown in a specific order, other orders of operation, including possibly concurrent or continual execution of at least portions of one or more operations, may be possible in some implementations of method 300, as well as other methods discussed herein. For example, each of the operations 308 and 310 may be performed in a continual, repetitive, or ongoing manner in response to multiple requests received from one or more requesting devices 106 for partitions of the same data resource 101.

Figure 4:
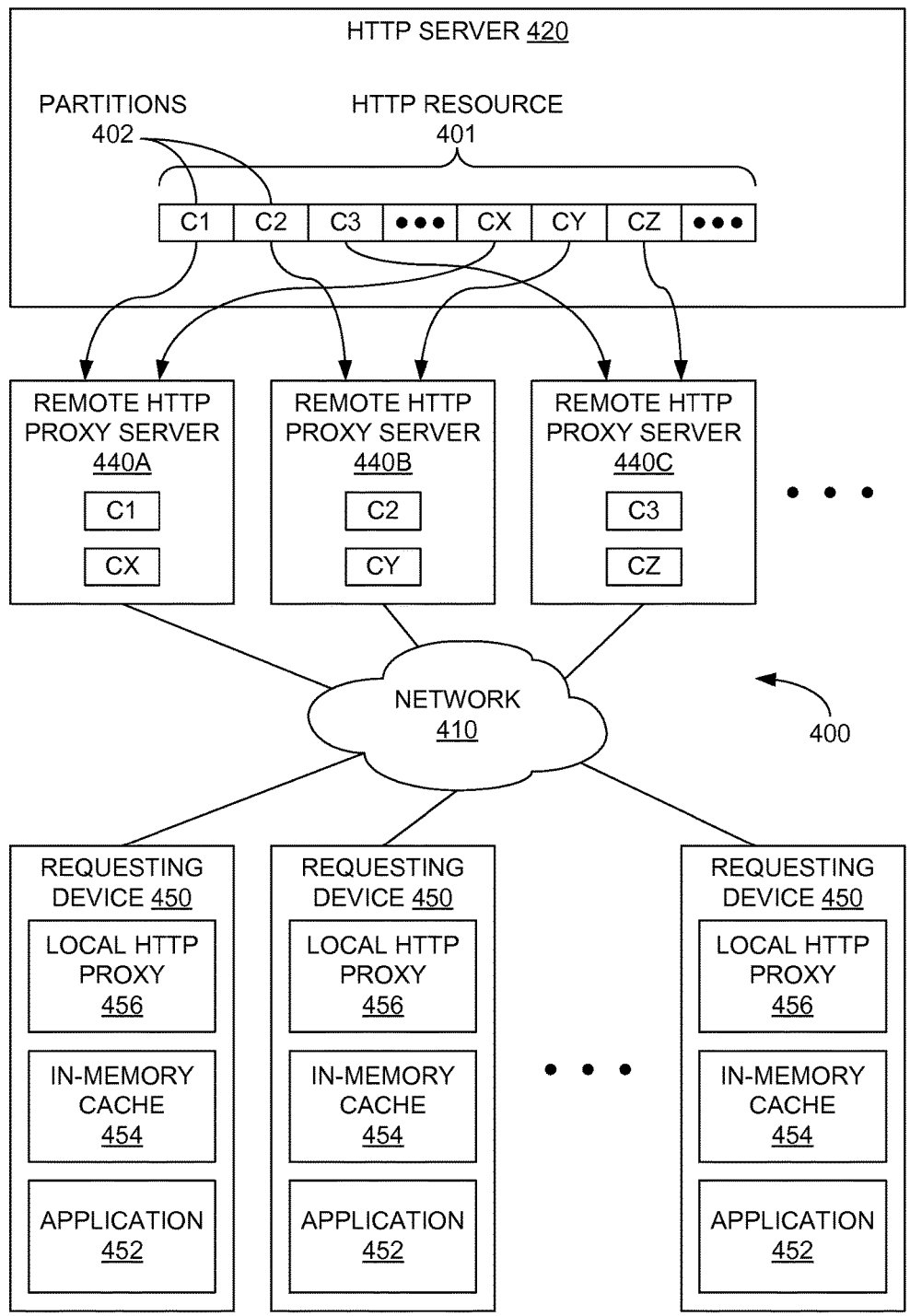
FIG. 4 is a block diagram of another example communication network employing distributed caching.

FIG. 4 is a block diagram of another example communication network 400 employing distributed caching. In this example, an HTTP server 420 includes, or may access, an HTTP resource 401, such as, for example, a large video file, audio file, image file, text file, or the like. The HTTP server 420 may serve as an example of the originating server 102 of FIG. 1, and the HTTP resource 401 may be an example of the data resource 101 of FIG. 1. Further, the HTTP resource 401 is partitioned into a plurality of partitions 402, possibly of equal size or length, as discussed in greater detail above. Some of the partitions 402 are labeled, for example, C1, C2, C3, CX, CY, and CZ for purposes of the ensuing explanation, and are not necessarily representative of any particular address assigned to each of the partitions 402. The HTTP server 420 may also store multiple HTTP resources other than HTTP resource 401, but such resources are not explicitly illustrated in FIG. 4.

Coupled to the HTTP server 420 are a number of remote HTTP proxy servers 440, identified individually as 440A, 440B, 440C, and so on. As depicted in FIG. 4, each of the partitions 402 of the HTTP resource 401 has been distributed to one of the remote HTTP proxy servers 440. More specifically, partitions C1 and CX are distributed to the remote HTTP proxy server 440A, partitions C2 and CY are distributed to the remote HTTP proxy server 440B, and partitions C3 and CZ are distributed to the remote HTTP proxy server 440C. Other partitions 402 of the HTTP resource 401 may also be stored in the same remote HTTP proxy servers 440A, 440B, and 440C. In one example, the partitions 402 are assigned unique addresses and distributed according to hashed versions of those addresses, as described above.

Coupled to the remote HTTP proxy servers 440 by way of a network 410 are multiple requesting devices 450. Each of the requesting devices 450 may serve as an example of one of the requesting devices 106 of FIG. 1. The network 410 may be any kind of communication network, such as the network 110 of FIG. 1. In the example of FIG. 4, each requesting device 450 may include an application 452 that initiates or issues requests for one or more of the partitions 402 stored in the remote HTTP proxy servers 440. The application 452 may be any application that requests, retrieves, receives, or consumes at least a portion of the HTTP resource 401, such as, for example a web browser, a media application, or the like. Each application 452 of each requesting device 450 need not be the same application 452, and each requesting device 450 may include more than one such application 452.

At least some of the requesting devices 450 may also include an in-memory cache 454 and a local HTTP proxy 456. Generally, the in-memory cache 454 and the local HTTP proxy 456 may serve as caching levels that, when operating in conjunction with the remote HTTP proxy servers 440, operate as a hierarchical multilevel cache of the partitions 402 for each application 452. For example, the in-memory cache 454 (e.g., a random-access cache) may be considered a first-level (L1) cache, the local HTTP proxy 456 may serve as a second-level (L2) cache, and the plurality of the remote HTTP proxy servers 440 may be a third-level cache (L3) for the applications 452. In some implementations, the in-memory cache 454 of a requesting device 450 may possess a faster access time and/or have a smaller storage capacity than that of the local HTTP proxy 456 in the same requesting device 450. Similarly, at least some of the local HTTP proxies 456 may possess a smaller storage capacity than that of each of the remote HTTP proxy servers 440, and may provide a faster apparent access time compared to that of each of the remote HTTP proxy servers 440 due to the local HTTP proxies 456 being located within its particular requesting device 450. This arrangement eliminates any access delay attributable to the network 410 during access of the HTTP partitions 402 stored at the remote HTTP proxy servers 440.

Figure 5:
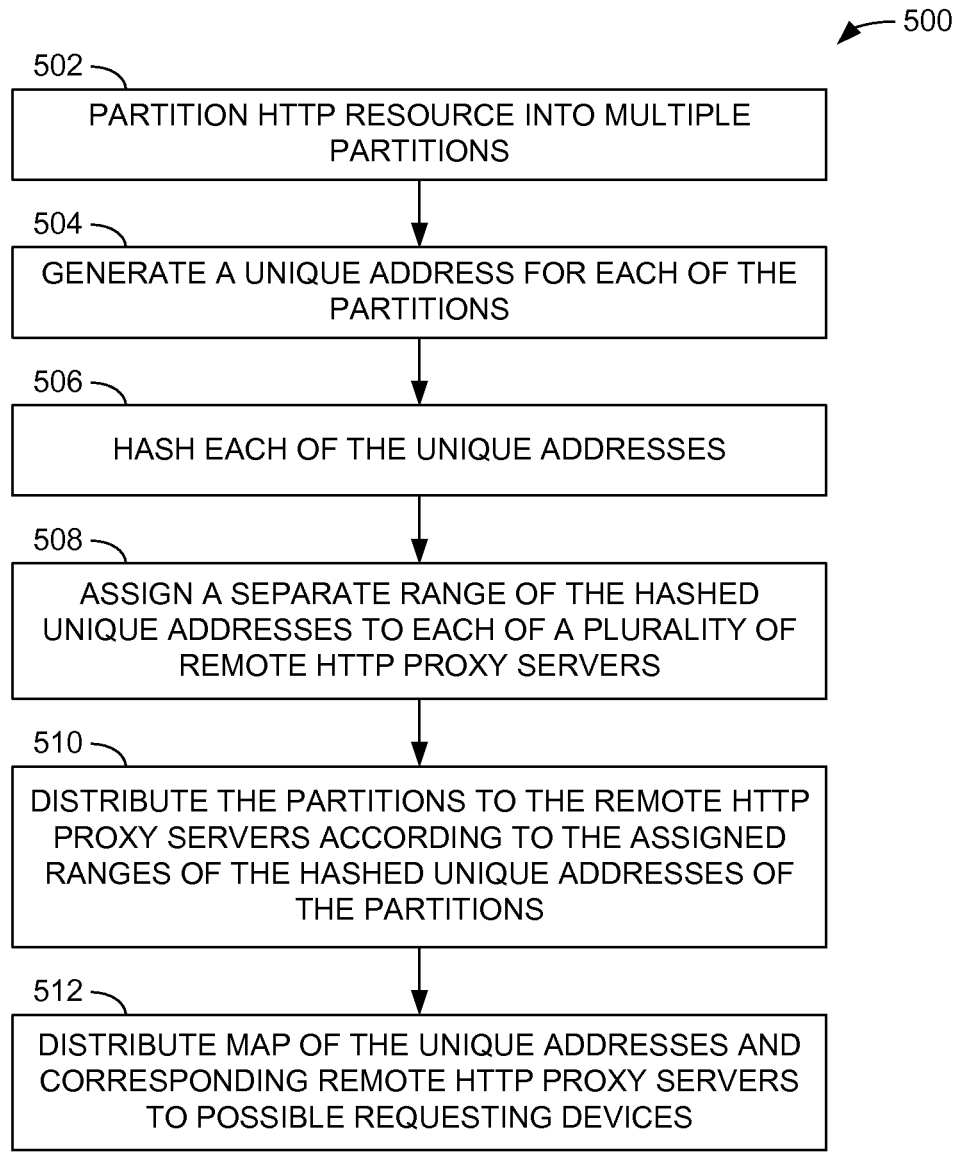
FIG. 5 is a flow diagram illustrating an example method of partitioning and distributing an HTTP resource to multiple HTTP proxy servers.
Figure 6:
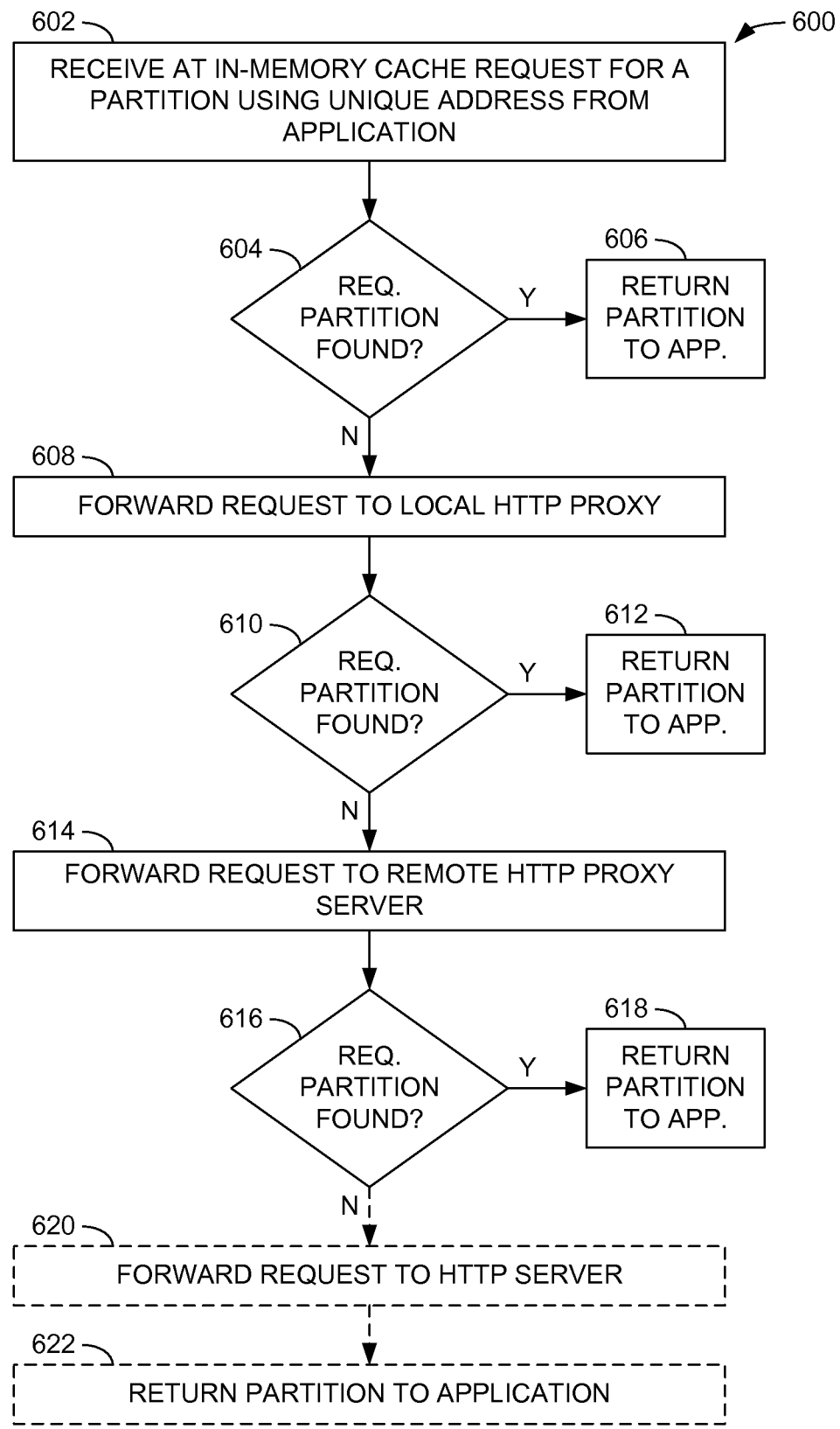
FIG. 6 is a flow diagram illustrating an example method of servicing a request for an HTTP resource partition.
Figure 7:
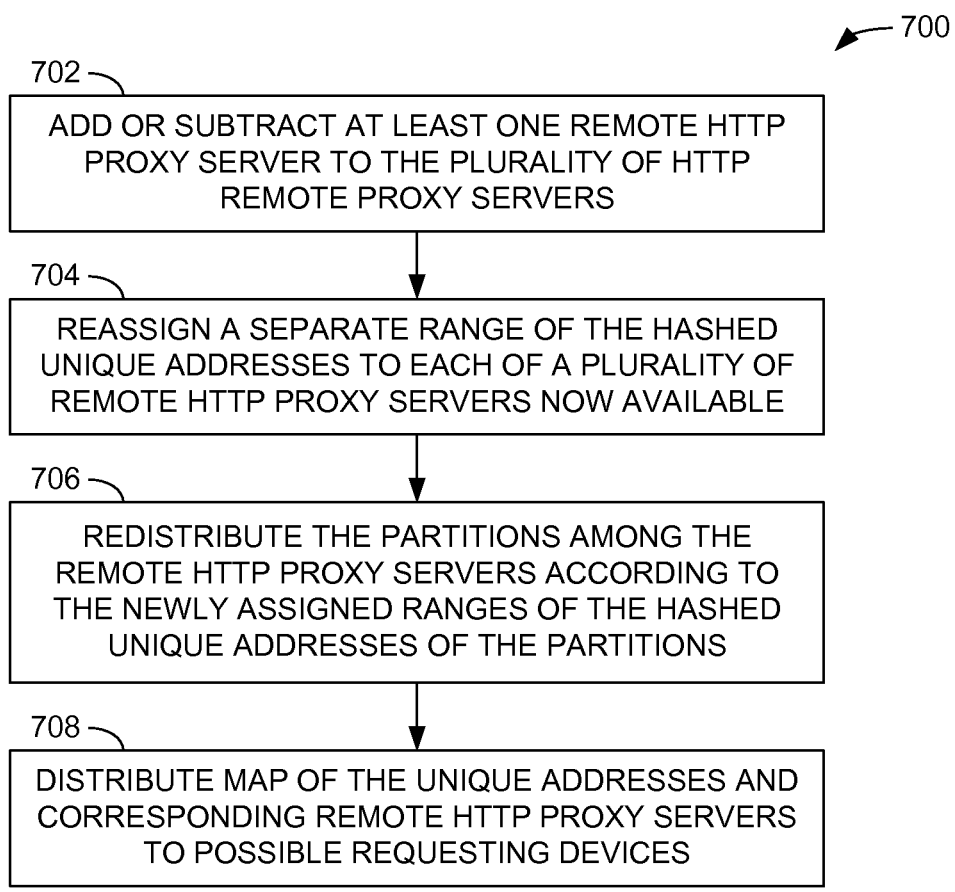
FIG. 7 is a flow diagram illustrating an example method of redistributing HTTP resource partitions based on a change in a number of HTTP proxy servers.

FIGS. 5, 6, and 7 are flow diagrams illustrating example methods of operating the communication network 400 of FIG. 4. FIG. 5, for example, is a flow diagram illustrating an example method 500 of partitioning and distributing the HTTP resource 401 to the multiple remote HTTP proxy servers 440. In one example, a cache control system, such as the cache control system 200 of FIG. 2, may perform the method 500. In the method 500, the HTTP resource 401 may be partitioned into multiple partitions 402 (operation 502). In one example, the partitions 402 are of the same length or size. In some implementations, one of the partitions 402, such as the last partition 402, may be padded with additional, unused data (e.g., zeroes) to ensure that the padded partition 402 is equal in length to that of the other partitions 402. Further, the partition length may be a standard or constant length for all HTTP resources 401, or may be varied from one HTTP resource 401 to another depending on the type of data involved (e.g., video, audio, etc.), the overall size of the HTTP resource 401, and other factors.

A unique address may then be generated for each of the partitions 402 (operation 504). For example, the address for a particular partition 402 may be based on an identifier for the original resource 401 (e.g., a URL of the HTTP resource 401) and a byte offset of the beginning of the partition 402 from the beginning of the HTTP resource 401. The URL and the byte offset may be concatenated or otherwise combined in some implementations. In another example, if the length of each of the partitions 402 is a known and fixed value, the address for a partition 402 may be based on an identifier of the HTTP resource 401 and a sequence number, in which the partitions 402 are numbered according to their location in the HTTP resource 401 from beginning to end. Other ways of generating the unique address for each of the partitions 402 are also possible.

Each of the unique partition addresses may then be hashed (operation 506) to yield hashed partition addresses. In one example, the hashing function or algorithm used to hash each partition address may be configured such that the hashed partition addresses for the single HTTP resource 401 are relatively evenly distributed within a possible span of hashed addresses. Example hashing algorithms include, but are not limited to, CRC functions, SHA algorithms, and so forth, as mentioned above.

Given a possible span for the hashed partition addresses, a separate range of the possible addresses may be assigned to each of the remote HTTP proxy servers 440 (operation 508). In one example, the ranges are non-overlapping, abut end-to-end, and collectively cover the entire span of possible hashed addresses. Accordingly, in one example, the possible span of hashed partition addresses may be divided by a number of the remote HTTP proxy servers 440 available to store the partitions 402 to yield the size or length of each range of addresses to be assigned to each remote HTTP proxy server 440. Each of these ranges may then be assigned to a separate remote HTTP proxy server 440. In other examples, additional remote HTTP proxy servers 440 may be added to mirror other remote HTTP proxy servers 440 by assigning the additional remote HTTP proxy servers 440 to previously assigned ranges.

Each of the partitions 402 may then be distributed to one or more of the remote HTTP proxy servers 440 according to the assigned ranges of hashed partition addresses (operation 510). For example, if the hashed address of a particular partition 402 (e.g., partition C1) lies within a range of hashed addresses assigned to a specific remote HTTP proxy server 440 (e.g. server 440A), that partition 402 is distributed to the remote HTTP proxy server 440A. As a result, at least some, and possibly all, of the partitions 402 are distributed to one or more of the remote HTTP proxy servers 440.

To facilitate access to the partitions 402 at the remote HTTP proxy servers 440 by the requesting devices 450, information, such as a map, table, directory, or the like, that indicates the unique addresses of the partitions 402 and the particular remote HTTP proxy servers 440 at which they are stored may be distributed to the requesting devices 450 (operation 512). In other implementations, the information may indicate each range of hashed addresses and its corresponding assigned remote HTTP proxy server 440. In some examples, the information may be transmitted from the device or system (e.g., the cache control system 200 of FIG. 2) to the requesting devices 450, or may be stored at one or more of the remote HTTP proxy servers 440, the cache control system 200, or another communication device or system for retrieval by the requesting devices 450.

FIG. 6 is a flow diagram illustrating an example method 600 of servicing a request for at least one HTTP resource partition 402. In the method 600, an in-memory cache 454 of a requesting device 450 may receive a request for one or more partitions 402 from an application 452 executing in the requesting device 450 (operation 602). The request may take one of several forms. For example, the request may be a direct request for one or more partitions 402 by using the unique address of the desired partitions 402, as discussed above. In other implementations, the request may indicate the HTTP resource 401 and the ranges of bytes being requested within the HTTP resource 401, such as what may be indicated in an HTTP Range Request. In this latter embodiment, the particular cache level receiving the request may determine which partitions 402 of the HTTP resource 401 are being requested based on the byte range.

If the requested partition 402 is located in the in-memory cache 454 (operation 604), the in-memory cache 454 may return the data of the requested partition 402 to the application 452 (operation 606). In one example, the entire requested partition 402 is provided to the application 452. In other implementations, the in-memory cache 454 may indicate the location of the partition 402 in memory, and the application 452 may directly read either the entire partition 402 or the desired portion thereof from the memory.

If, instead, the in-memory cache 454 does not include the requested partition 402 (operation 604), the request may be forwarded, or a corresponding request may be generated and transmitted, to the local HTTP proxy 456 (operation 608). If the requested partition 402 is stored in the local HTTP proxy 456 (operation 610), the local HTTP proxy 456 may return the requested partition 402 to the application 452 (operation 612). In some implementations, the local HTTP proxy 456 may operate as a separate process from a process in which the application 452 executes. As a result, the local HTTP proxy 456 and the application 452 may execute concurrently or simultaneously. In one example, the local HTTP proxy 456 may return the requested partition 402 via the in-memory cache 454, which may forward the requested partition 402 to the application 452 and possibly store the partition 402 so that the in-memory cache 454 may service future requests for that same partition 402. In one example, the in-memory cache 454 may need to delete another partition 402 to create storage space for the just-retrieved partition 402. To that end, the in-memory cache 454 may utilize one or more cache replacement policies, such as, for example, a least-recently-used (LRU) policy, by which the least recently used partitions 402 are deleted in favor of more recently used partitions 402.

If instead, the local HTTP proxy 456 does not contain the requested partition 402, the local HTTP proxy 456 may forward the request (or generate and transmit a corresponding request) to one of the remote HTTP proxy servers 440 (operation 614). In one example, the local HTTP proxy 456 forwarding the request may possess or maintain access to information, such as a table, map, or the like, indicating which of the multiple remote HTTP proxy servers 440 possesses the requested partition 402. For example, the information may directly relate the unique address of the requested partition 402 with its corresponding remote HTTP proxy server 440. In another example, the information may indicate each remote HTTP proxy server 440 and its associated hashed address range. In this latter implementation, the local HTTP proxy 456 may generate the hashed address of the requested partition 402 from the information provided in the request and determine the remote HTTP proxy server 440 that is associated with the range that includes the hashed address.

In response to determining the remote HTTP proxy server 440 that contains the requested partition 402, the local HTTP proxy 456 may request the requested partition 402 directly from the identified remote HTTP proxy server 440, which the remote HTTP proxy server 440 may then deliver to the requesting local HTTP proxy server 440. The local HTTP proxy 456 may, in turn, return the requested partition 402 to the application 452 (operation 618) via the in-memory cache 454, as well as possibly store the partition 402 internally to service subsequent requests for the same partition 402 from the application 452. As with the in-memory cache 454, the local HTTP proxy 456 may delete or remove another locally-stored partition 402 according to some cache replacement policy to allow storage of the current partition 402 in the local HTTP proxy 456. Similarly, the in-memory cache 454, upon receiving the partition 402 from the local HTTP proxy 456, may store the requested partition 402 in conjunction with forwarding the partition 402 to the application 452, as described earlier.

In some cases, the identified remote HTTP proxy server 440 may not possess the requested partition 402, or the remote HTTP proxy server 440 may be unavailable or inoperative (operation 616). Under such conditions, the remote HTTP proxy server 440 (if operative and available) or the local HTTP proxy 456 may forward the request for the partition 402 to the HTTP server 420 (operation 620). In response, the HTTP server 420 may return the requested partition 402 to the requesting local HTTP proxy 456 (possibly via the associated remote HTTP proxy server 440, if operative and available), which may return the partition 402 to the application 452 (operation 622), as described above.

FIG. 7 is a flow diagram illustrating an example method 700 of redistributing HTTP resource partitions 402 based on a change in the number of the remote HTTP proxy servers 440 available. In the method 700, one or more remote HTTP proxy servers 440 may be added to, or subtracted from, the current available remote HTTP proxy server 440 pool (operation 702). In response to the change in the number of available remote HTTP proxy servers 440, the range of hashed unique partition addressees corresponding to each of the remote HTTP proxy servers 440 now available may be re-determined or recalculated, and reassigned to their corresponding remote HTTP proxy servers 440 (operation 704). In one example, similar to that discussed above with respect to operation 508 of FIG. 5, a span of possible hashed addresses may be determined, and then the span may be evenly divided into a number of separate individual ranges equal to the number of remote HTTP proxy servers 440 now available, with each of the remote HTTP proxy servers 440 being assigned one of the ranges, assuming no redundancy in range coverage. The partitions 402 stored in the remote HTTP proxy servers 440 may then be redistributed among the remote HTTP proxy servers 440 according to which range each hashed partition address belongs (operation 706). To perform the redistribution, the partitions 402 may be copied between the remote HTTP proxy servers 440, from the HTTP server 420 to the remote HTTP proxy servers 440, or some combination thereof. Also, a map, table, or similar information indicating the partition addresses and their corresponding remote HTTP proxy servers 440 may be distributed to the requesting devices 450 (operation 708), as discussed in greater detail above with respect to operation 512 of FIG. 5.

In some examples, changes may be made to the number of available remote HTTP proxy servers 440 in response to changes in network traffic resulting from a number of requests for the partitions 402 stored in the remote HTTP proxy servers 440. For example, one or more remote HTTP proxy servers 440 may be added if network traffic to the remote HTTP proxy servers 440 has increased such that additional delays in individual partition accesses are being experienced. In contrast, at least one remote HTTP proxy server 440 may be removed if excess network capacity to the remote HTTP proxy servers 440 is detected. As a result, the number of remote HTTP proxy servers 440 may be scaled appropriately in relation to the demand for the partitions 402 by the requesting devices 450.

As a result of at least some of the embodiments described above, access latency to portions or partitions of a data resource, such as a video file, is reduced compared to environments in which the entire data resource must first be acquired. Further, overall access time to a particular partition may be greatly reduced by spreading access traffic for each of the partitions across a number of remote proxy servers. In addition, with the use of local proxies and in-memory caches located within devices that request the partitions, subsequent accesses to previously retrieved partitions may then be serviced internally within the devices without incurring additional network traffic between the remote proxy servers and the requesting devices. Also, adjustments can be made to increases or decreases in access traffic to the remote proxy servers by way of increasing the number of remote proxy servers and redistributing the data resource partitions thereamong.

Figure 8:
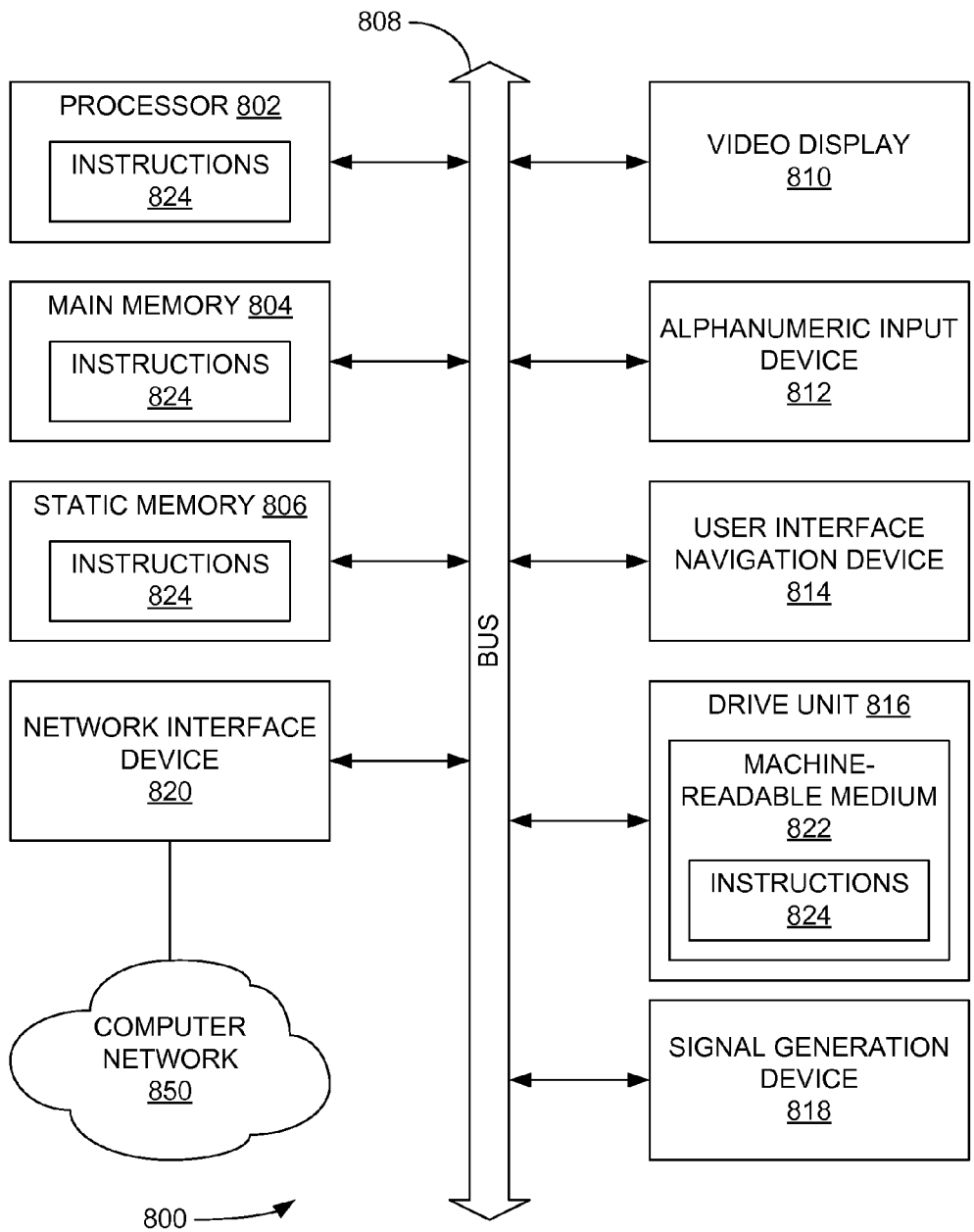
FIG. 8 is a block diagram of a machine in the example form of a processing system within which may be executed a set of instructions for causing the machine to perform any one or more of the methodologies discussed herein.

FIG. 8 depicts a block diagram of a machine in the example form of a processing system 800 within which may be executed a set of instructions 824 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 800 includes a processor 802 (e.g., a central processing unit (CPU), a graphics processing unit (GPU), or both), a main memory 804 (e.g., random access memory), and static memory 806 (e.g., static random-access memory), which communicate with each other via bus 808. The processing system 800 may further include video display unit 810 (e.g., a plasma display, a liquid crystal display (LCD), or a cathode ray tube (CRT)). The processing system 800 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804, the static memory 806, and/or within the processor 802 during execution thereof by the processing system 800, with the main memory 804, the static memory 806, and the processor 802 also constituting machine-readable, tangible media.

The data structures and instructions 824 may further be transmitted or received over a computer network 850 via the network interface device 820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 800) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (for example, configured by software), may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 802 that is configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses that connect the modules). In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and may operate on a resource (for example, a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine but deployed across a number of machines. In some example embodiments, the processors 802 may be located in a single location (e.g., within a home environment, within an office environment, or as a server farm), while in other embodiments, the processors 802 may be distributed across a number of locations.

While the embodiments are described with reference to various implementations and exploitations, it will be understood that these embodiments are illustrative and that the scope of the claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of caching data in a communication network, the method comprising:

partitioning, at an originating server of the communication network, a data resource into multiple data partitions;

assigning, at the originating server, a unique address to each of the data partitions;

generating, by the originating server, a hashed partition address for each data partition based on the unique address for each data partition;

distributing, from the originating server, each of the data partitions to at least one of a plurality of proxy servers based on the hashed partition address corresponding to each data partition, wherein the plurality of proxy servers and a local device are configured as a multilevel hierarchical cache of partitions for an application running on the local device, the multilevel hierarchical cache of partitions comprising at least a first level cache and a second level cache running on the local device, wherein each of the proxy servers is configured to:

receive a read request for one of the data partitions stored at least one of the proxy servers, wherein the read request is received from the second level proxy based on the second level proxy determining the second level proxy does not contain the requested data partition in response to receiving a previous read request from the first level proxy when the first level proxy does not contain the requested data partition; and transmit the one of the data partitions to a source of the read request in response to the read request.

2. The method of claim 1, wherein the unique address for the one of the data partitions is based on an identifier of the data resource and known offset of the one of the data partitions within the data resource.

3. The method of claim 1, wherein the range of the hashed partition addresses assigned to each of the plurality of proxy servers is based on a number of the plurality of proxy servers.

4. The method of claim 3, further comprising:
modifying, after the range of the hashed partition addresses are assigned to each of the plurality of proxy servers, the number of the plurality of proxy servers; and
assigning a second range of the hashed partition addresses to each of the plurality of proxy servers based on the modified number of the plurality of proxy servers.

5. The method of claim 1, wherein:
the previous read request originates from a random-access cache located in the local device; and
the previous read request is generated by the random-access cache in response to the random-access cache receiving an initial request for the one of the data partitions when the random-access cache does not include the one of the data partitions.

6. The method of claim 5, wherein:
the initial read request originates from the application executing on the local device.

7. The method of claim 6, wherein:
the second level proxy and the application are executed in separate processes in the local device.

8. The method of claim 6, wherein:
at least one of the second level proxy and the random-access cache operate according to a least-recently-used caching policy.

9. The method of claim 1, wherein:
the data resource comprises a hypertext transfer protocol file.

10. The method of claim 1, wherein each of the proxy servers is assigned a range of possible hash partition addresses.

11. A non-transitory computer-readable storage medium comprising instructions that, when executed by at least one processor of a machine, cause the machine to perform operations comprising:
partitioning, at an originating server of a communication network, a data resource into multiple data partitions;
assigning, at the originating server, a unique address to each of the data partitions;
generating, by the originating server, a hashed partition address for each data partition based on the unique address for each data partition;
distributing, from the originating server, each of the data partitions to at least one of a plurality of proxy servers based on the hashed partition address for each data partition, wherein each of the proxy servers is assigned a range of possible hash partition addresses, wherein the plurality of proxy servers and a local device are configured as a multilevel hierarchical cache of partitions for an application running on the local device, the multilevel hierarchical cache of partitions comprising at least a first level cache and a second level cache running on the local device, wherein each of the proxy servers is configured to:
receive a read request for one of the data partitions stored at the proxy server, wherein the read request is received from a local proxy executing on a device and the read request was generated in response to the local proxy receiving a previous read request for the one of the data partitions and determining the local proxy does not include the one of the data partitions; and
transmit the one of the data partitions to a source of the read request in response to the read request.

12. A system comprising:
an originating server;
a plurality of proxy servers communicatively coupled to the originating server;
at least one processor; and
memory comprising instructions that, when executed by the at least one processor, cause the at least one processor to perform operations comprising:
partitioning, at the originating server, a data resource into multiple data partitions;
assigning, at the originating server, a unique address to each of the data partitions;
generating, by the originating server, a hashed partition address for each data partition based on the unique address for each data partition;
distributing, from the originating server, each of the data partitions to at least one of the plurality of proxy servers based on the hashed partition address corresponding to each data partition, wherein each of the proxy servers is assigned a range of possible hash partition addresses;
receiving, at one of the proxy servers, a read request for one of the data partitions stored at the one of the proxy servers, wherein the read request is received from a local proxy and the read request was generated in response to the local proxy receiving a previous read request for the one of the data partitions and determining the local proxy does not include the one of the data partitions, wherein the previous read request was received from a random-access cache and the previous read request was generated in response to the random-access cache receiving an initial read request and determining the random-access cache does not include the one of the data partitions; and
transmitting, from the one of the proxy servers, the one of the data partitions to a source of the read request in response to the read request.

13. The system of claim 12, wherein the unique address of the one of the data partitions is based on an identifier of the data resource and a known offset of the one of the data partitions within the data resource.

14. The system of claim 13, wherein the range of the hashed partition addresses assigned to each of the plurality of proxy servers is based on a number of the plurality of proxy servers.

15. The system of claim 14, wherein the operations further comprise:

modifying, after the range of the hashed partition addresses are assigned to each of the plurality of proxy servers, the number of the plurality proxy servers; and
assigning a second range of the hashed partition addresses to each of the plurality of proxy servers based on the modified number of the plurality of proxy servers.

16. The system of claim 12, wherein:
the initial request originates from an application executing on the local device.

* * * * *

UNITED STATES PATENT AND TRADEMARK OFFICE
CERTIFICATE OF CORRECTION

PATENT NO. : 9,900,384 B2
APPLICATION NO. : 13/940574
DATED : February 20, 2018
INVENTOR(S) : Franz Xaver Bayerl It is certified that error appears in the above-identified patent and that said Letters Patent is hereby corrected as shown below:

In the Claims

Column 13, Line 5: Please insert --by-- after "stored"

Signed and Sealed this
Third Day of April, 2018

Andrei Iancu
*Director of the United States Patent and Trademark Office*